(12) United States Patent
Henry

(10) Patent No.: US 7,332,672 B2
(45) Date of Patent: Feb. 19, 2008

(54) CABLE PROTECTOR WITH RAISED BARRIER LID

(76) Inventor: Stephen K. Henry, 3825 Northbrook Dr., #F, Boulder, CO (US) 80302

( * ) Notice: Subject to any disclaimer, the term of this patent is extended or adjusted under 35 U.S.C. 154(b) by 0 days.

(21) Appl. No.: 11/303,796

(22) Filed: Dec. 16, 2005

(65) Prior Publication Data

US 2007/0144778 A1   Jun. 28, 2007

(51) Int. Cl.
*H02G 3/00* (2006.01)
(52) U.S. Cl. .......................... 174/68.1; 97/503; 97/101
(58) Field of Classification Search ..................... None
See application file for complete search history.

(56) References Cited

U.S. PATENT DOCUMENTS 2,166,516 A    7/1939  Bainbridge 6,323,421 B1 *  11/2001  Pawson et al.  ............. 174/503
6,481,036 B1    11/2002  Duvall
6,499,410 B1 *  12/2002  Berardi  ....................... 104/275

OTHER PUBLICATIONS

Indoor Pedestrian Safety System brochure, 2003, Rubbermaid Commercial Products LLC, Winchester, Virginia, U.S.A.

* cited by examiner

*Primary Examiner*—Jinhee Lee
(74) *Attorney, Agent, or Firm*—Dorr, Carson & Birney, P.C.

(57)  ABSTRACT

A cable protector includes a base with a number of channels for carrying cables extending along its upper surface, and a raised barrier lid removably covering the channels and extending above the base to a sufficient height to provide a visual indicator to passersby. The barrier lid may include an upper portion forming a wall or bearing visual graphics providing information to passersby. The upper portion of the barrier lid may also include a connector to removably securing an attachment. such as a light, sign, alarm, or a flexible member for marking a traffic pathway.

11 Claims, 6 Drawing Sheets

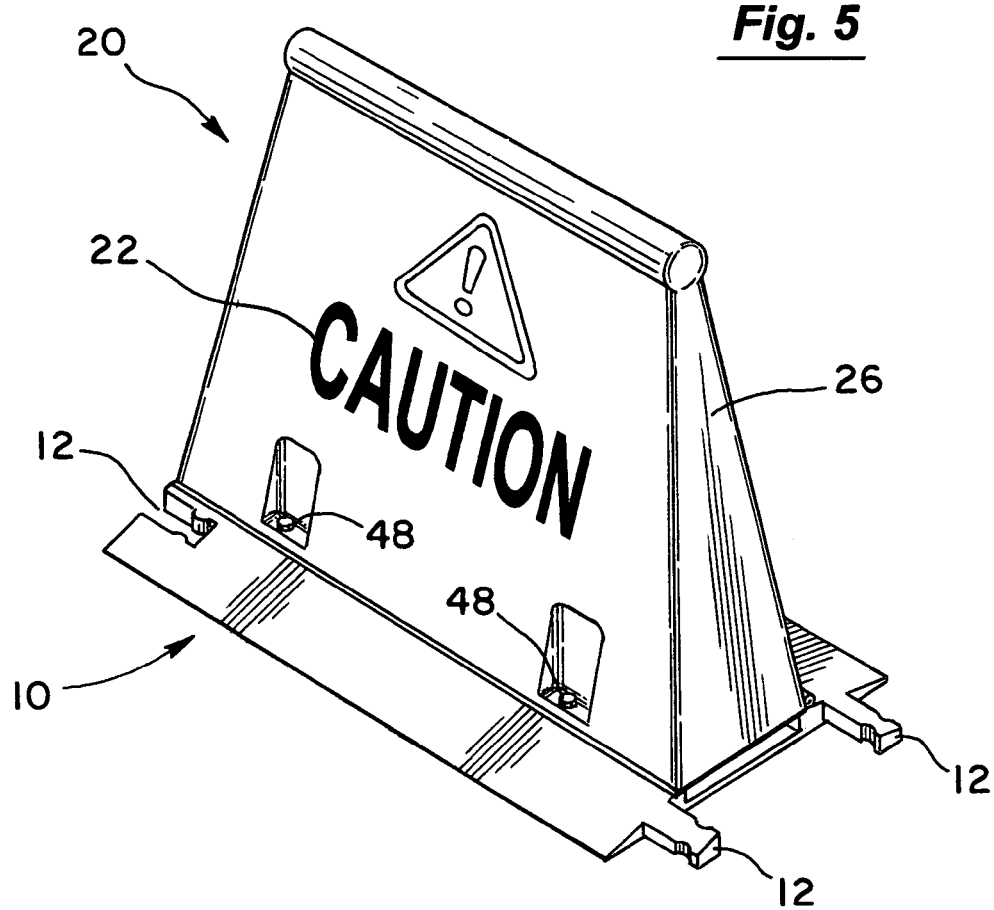
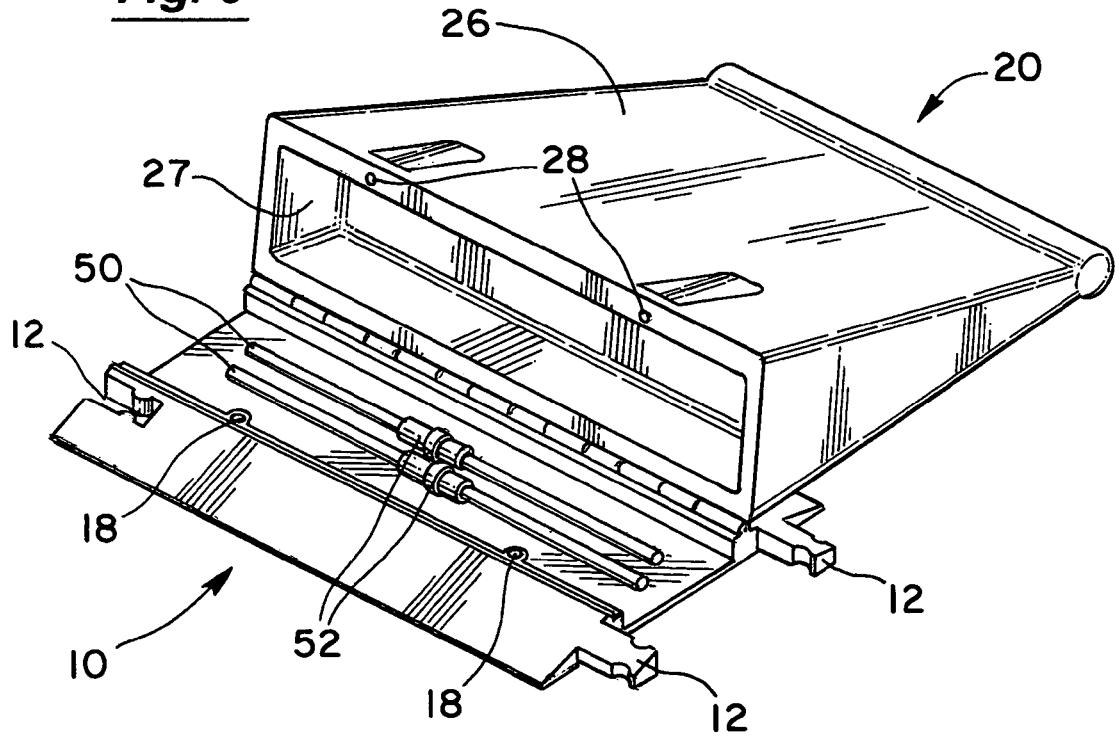

CABLE PROTECTOR WITH RAISED BARRIER LID

BACKGROUND OF THE INVENTION

1. Field of the Invention

The present invention relates generally to the field of cable protectors. More specifically, the present invention discloses a cable protector with a raised barrier lid to provide a visual indicator or warning to passersby and to provide a storage area for excess cable or cable connectors or plugs.

2. Statement of the Problem

Hose and cable bridging protective devices have been used in the past to prevent damage for hoses, cables, wiring and the like by vehicles and pedestrians. These cable protectors also help to minimize the risk of pedestrians tripping over cables. For the purposes of this disclosure, the term "cable" should be broadly interpreted to include cables, hoses, electrical wiring, conduits, optical fibers, pneumatic tubing, plumbing, and the like.

Many conventional cable protectors include one or more channels extending in parallel between the ends of the cable protector to receive the cables. Side ramps or beveled edges extend laterally outward from both sides of the cable protector to allow vehicles to roll over the top of the cable protector. Each cable protector typically includes a set of end connectors that enable a series of cable protectors to be attached together in a modular end-to-end fashion to any desired length.

Other cable protectors have channels that facilitate cables carried in other patterns, such as Y, X or T-shaped configurations, or 45° or 90° turns. These often require extra space within the cable protector to accommodate connection plugs, electrical junctions, extra cable and the like. In addition, it is often advantageous to be able to prominently mark such junctions for the benefit of workers, and to warn passersby.

Traditionally, cable protectors have been designed to maintain as low a profile as possible to minimize the risk that pedestrians might trip or stumble over the cable protector. A low-profile cable protector is also beneficial in reducing the degree of obstruction presented to vehicles, and in particular wheel chairs, crossing over the cable protector. Thus, maintaining a minimal height has traditionally been one of the major goals in designing cable protectors. Creating a cable protector with components that intentionally extend upward to a significant height would be counter to the conventional wisdom in this field.

Notwithstanding the previous discussion, short side rails have occasionally been attached to the side ramps of a cable protector to help prevent a wheeled vehicle (e.g., a wheel chair) from accidentally rolling off the edges of the side ramp. One example of this is disclosed in U.S. Pat. No. 6,481,036 (Duvall).

U.S. Pat. No. 2,166,516 (Bainbridge) discloses a ramp for protecting hoses that includes two triangular signs mounted on vertical rods to mark the lateral edges of the ramp and to serve as warning signals for vehicles crossing the ramp.

Nevertheless, there continues to be a need for a modular cable protector that can be used for protecting cables and cable connectors, and for providing visual indicators to passersby and storage of extra cable.

3. Solution to the Problem

The present invention addresses these shortcomings of the prior art by providing a modular cable protector in which the lid serves as a raised visual barrier. This barrier lid both covers the channels for the cables in the base of the cable protector and serves as a visual indicator to passersby. For example, the barrier lid can be decorated with graphics to direct or warn pedestrians. In addition, the bottom of the barrier lid can include a recess above the cable channels to accommodate electrical plugs or connectors, or storage of extra cable.

SUMMARY OF THE INVENTION

This invention provides a cable protector that includes a base with a number of channels for carrying cables extending along its upper surface, and a raised barrier lid removably covering the channels and extending above the base to a sufficient height to provide a visual indicator to passersby.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 5 is a perspective view of another embodiment with a wall barrier lid in an upright or closed position.

FIG. 6 is a perspective view of the embodiment shown in FIG. 5 with the wall barrier lid in an open position.

DETAILED DESCRIPTION OF THE INVENTION

Figure 1:
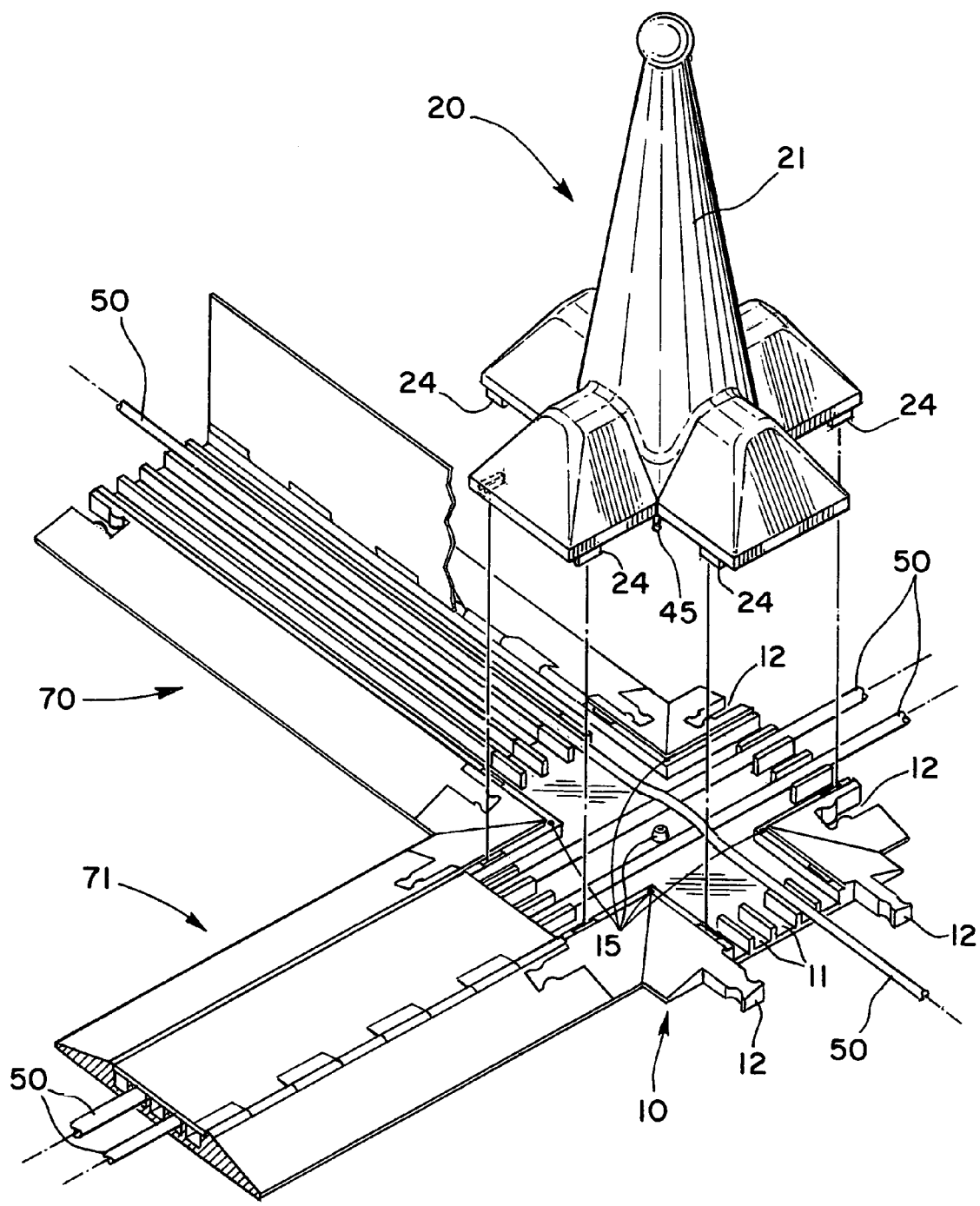
FIG. 1 is an exploded perspective view of the present invention connected to two modular cable protectors.
Figure 2:
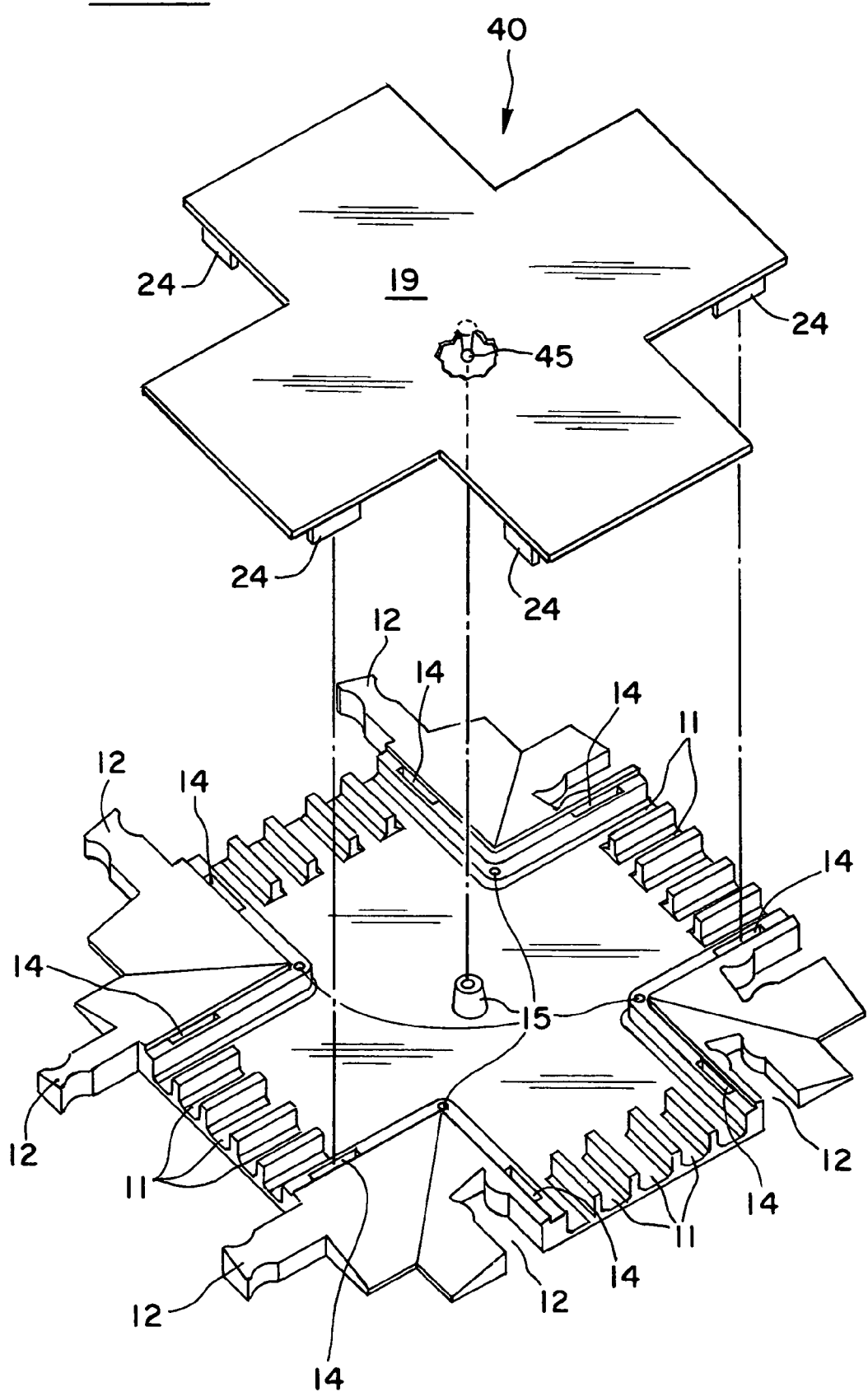
FIG. 2 is an exploded perspective view of the base 10 with an optional lid 19.

Turning to FIG. 1, an exploded perspective view is shown of the present invention connected to two modular cable protectors 70 and 71. The major components of the present invention are the base 10 and visual barrier lid 20. The base 10 has a bottom surface designed to lay on the ground and has an upper surface with a number of channels 11 for holding cables 50. The embodiment of the base shown in FIGS. 1 and 2 has a generally X-shaped pattern of channels 11. FIG. 2 shows another exploded view of the base 10 with an alternative flat lid 40 that can be used in place of the visual barrier lid 20.

Figure 3:
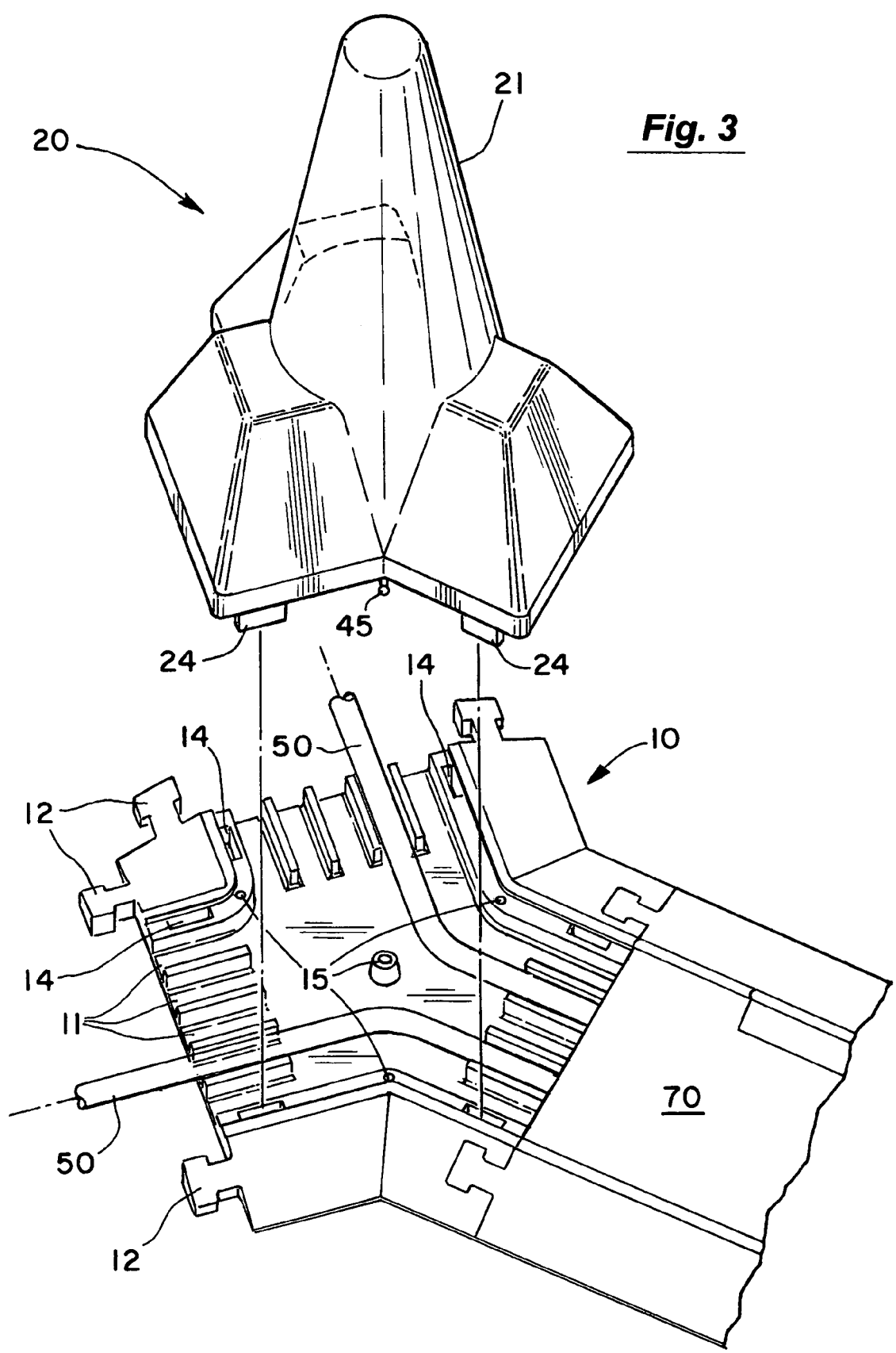
FIG. 3 is an exploded perspective view of another embodiment of the base 10 and barrier lid 20 for three-way connection of cable protectors in a Y-shaped configuration.

Other embodiments of the base 10 can provide Y or T-shaped patterns, 45° or 90° turns, or other patterns for the channels 11. FIG. 3 shows an example of a Y-shaped pattern for connecting up to three adjacent cable protectors. In contrast, the embodiment shown in FIGS. 5 and 6 has at least one channel extending along the longitudinal axis of the base 10. A plurality of channels could extend in parallel along the base 10. This configuration allows any desired number of cable protectors to fastened together in series with their channels aligned to provide a continuous straight run for the cables 50. The base 10 can also be equipped with cable protector connectors 12 to allow the base 10 to be removably secured to adjacent cable protectors 70, 71, as shown for example in FIG. 1. Here again, any of a wide variety of cable protector connectors can be selected.

Figure 4:
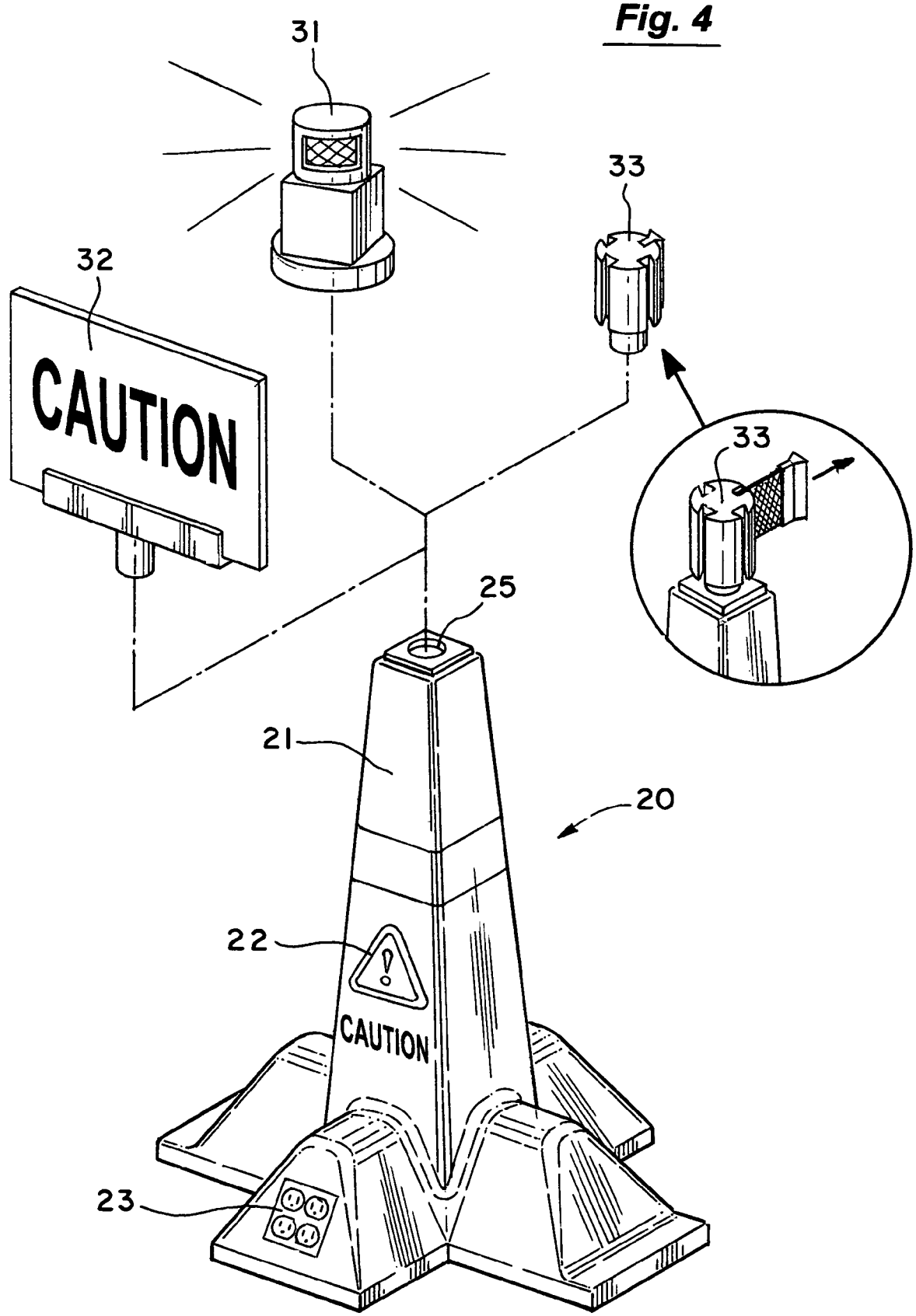
FIG. 4 is an exploded perspective view of another embodiment with interchangeable attachments 31, 32, 33 that can be connected to the top of the barrier lid 20.

Several embodiments of the visual barrier lid 20 are shown in the drawings. In the embodiment depicted in FIG. 1, the barrier lid 20 removably covers the channels 11 of the base 10 and has a cone-shaped upper portion 21 that extends above the base 10 to a sufficient height to provide a visual indicator to passersby. The cone-shaped upper portion 21 itself can serve as the visual indicator, or it can be decorated with graphics 22 as shown in FIGS. 4 and 5 (e.g., a sign or directional arrow) to warn passersby or direct traffic. In this embodiment, the base 10 and barrier lid 20 preferably have a total height sufficient to accommodate connectors and plugs beneath the barrier lid 20, and to help ensure visibility and minimize the risk of being a trip hazard. A recess or void 27 can also be formed in the bottom of the barrier lid 20, as illustrated in FIG. 6, to provide extra space for the cables 50, connectors and plugs 52.

A number of tabs 24 on the bottom of the barrier lid 20 insert into corresponding slots 14 in the base 10 to hold the barrier lid 20 in place atop the base 10. These allow the barrier lid 20 to be removably secured to the base 10, so that the barrier lid 20 covers the channels 11 in the base 10 when the barrier 20 is attached. Other types of base connectors could be readily substituted for this purpose. For example, FIGS. 1 and 3 also show pin-and-socket connectors 15, 45 that removably secure the barrier lid 20 to the base 10.

Another embodiment of the barrier lid 20 is shown in FIG. 4, in which the upper portion 21 of the barrier lid 20 has a generally square cross-section with four relatively flat surfaces for displaying graphics 22 to provide information to passersby. This embodiment also includes an attachment connector 25 on the top of the barrier lid 20 to accommodate a variety of interchangeable attachments, such as a light 31, sign 32, retractable ribbon 33, or a proximity-triggered audio alarm. For example, the retractable ribbon 33 can be extended to serve as a flexible member marking a traffic pathway. The barrier lid 20 can also be equipped with electrical outlets 23 powered by one or more of the electrical cables 50 in the channels 11 of the base 10.

FIGS. 5 and 6 show yet another embodiment of the present invention in which the upper portion of the barrier lid 20 is elongated to form a wall 26 extending along the axis of the channels 11. The top edge of the wall 26 can be shaped to serve as a hand rail. A hinge 29 allows the barrier lid 20 to be to rotated between an upright position covering the channels 11 of the base 10, as shown in FIG. 5, and a lowered position in which the channels 11 of the base 10 are uncovered, as depicted in FIG. 6. Alternatively, the wall barrier lid 20 could be designed to be completely removable from the base 10, as shown in the previous embodiments.

Bolts 48 can be fastened through sets of bolt holes 18 and 28 in the bottom rim of the barrier lid 20 and the base 10 to secure the barrier lid 20 in its upright or closed position shown in FIG. 5. Optionally, nuts can be molded into the plastic surrounding the holes 18 in the base 10 to engage the bolts 48. This also helps to reduce the risk of tampering or vandalism with regard to the cables 50 and their plugs 52 within the channels 11. It should be understood that other means of attaching the barrier lid 20 to the base 10 could be readily substituted. For example, the barrier lid 20 could snap fit to the base 10, or merely be set in place on the base 10.

Figure 7:
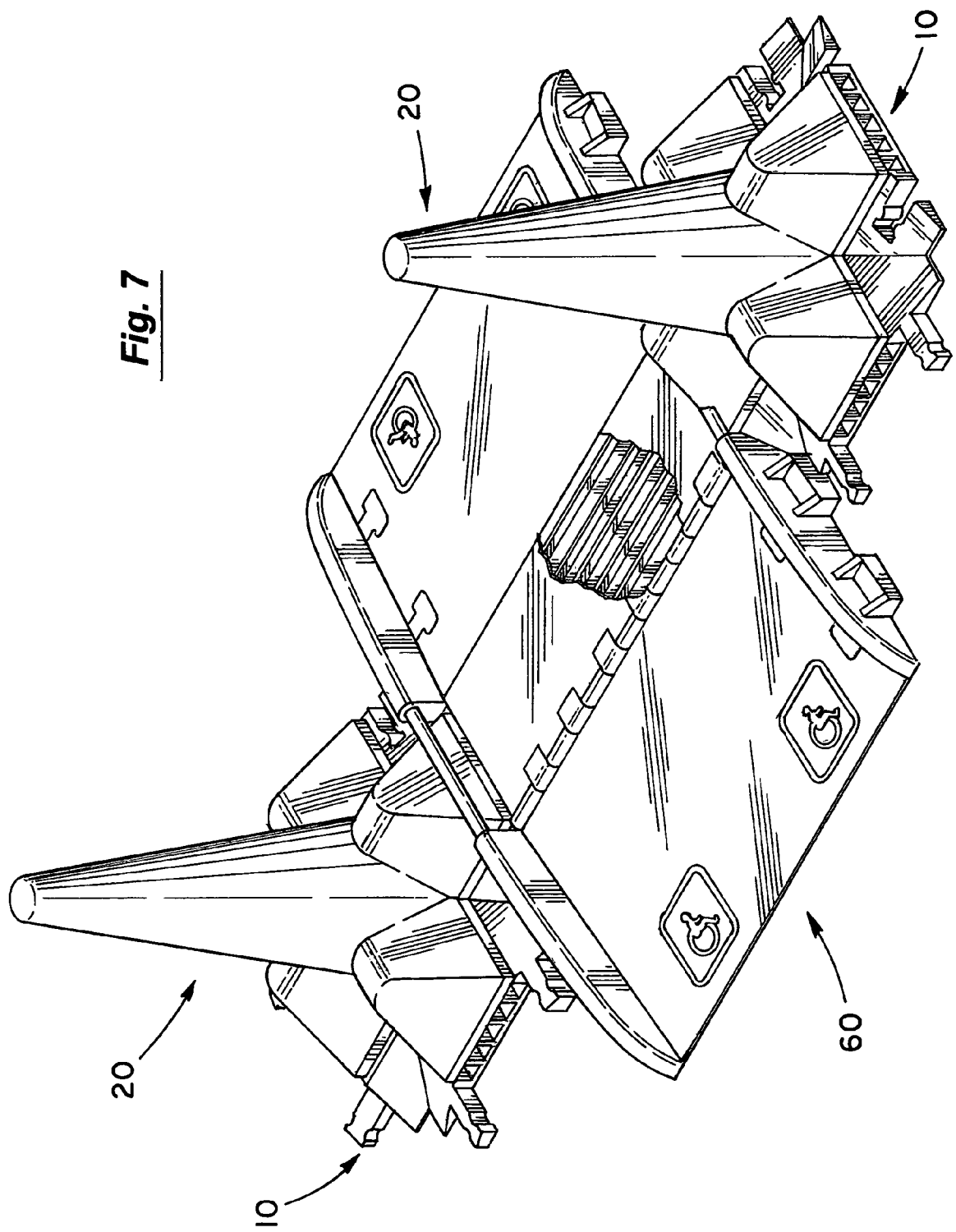
FIG. 7 is a perspective view of two cable protectors with raised barrier lids connected on either side of a wheel chair ramp assembly 60.

It should be understood that the present invention is intended to be modular and to allow interconnection with other cable protectors in virtually any desired arrangement. For example, FIG. 7 is a perspective view of two cable protectors with raised barrier lids connected on either side of a wheel chair ramp assembly 60.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A cable protector comprising:
    a base having an upper surface with at least one channel for carrying cables extending along the upper surface; and
    a raised barrier lid removably covering at least a portion of the channels of the base with:
    (a) a substantially cone-shaped upper portion extending above the base to a sufficient height to provide a visual indicator; and
    (b) a recess in the bottom of the barrier lid above the channels of the base and beneath the cone-shaped upper portion,
    said cable protector having an open state in which the channels are not covered by the barrier lid and a closed state in which the barrier lid is upright above the base to provide a visual indicator and cover the channels;
    wherein the raised barrier lid is configured to attach to the base to form a tight lid over the channels of the base.

2. The cable protector of claim 1 wherein the barrier lid is removably aft ached over the channels of the base by a base connector.

3. The cable protector of claim 1 wherein the barrier lid further comprises visual graphics providing information to passersby.

4. The cable protector of claim 1 wherein the barrier lid further comprises an electrical outlet.

5. The cable protector of claim 1 wherein the barrier lid further comprises a light.

6. The cable protector of claim 1 wherein the upper portion of the barrier lid further comprises a connector for removably securing an attachment to the barrier lid.

7. The cable protector of claim 6 wherein the attachment comprises a light.

8. The cable protector of claim 6 wherein the attachment comprises a sign.

9. The cable protector of claim 6 wherein the attachment comprises an alarm.

10. The cable protector of claim 6 wherein the attachment comprises a flexible member for marking a traffic pathway.

11. The cable protector of claim 1 wherein the base further comprises cable protector connectors for removable attachment to an adjacent cable protector with the channels of the base aligned with channels in the adjacent cable protector.

* * * * *